Sept. 13, 1949.　　　A. A. PANYARD　　　2,481,945
TOOL HOLDING CHUCK
Filed Oct. 30, 1944　　　2 Sheets-Sheet 1

INVENTOR.
Alfred A. Panyard
BY Parker & Burton
attorneys

Sept. 13, 1949.　　　A. A. PANYARD　　　2,481,945
TOOL HOLDING CHUCK
Filed Oct. 30, 1944　　　2 Sheets-Sheet 2
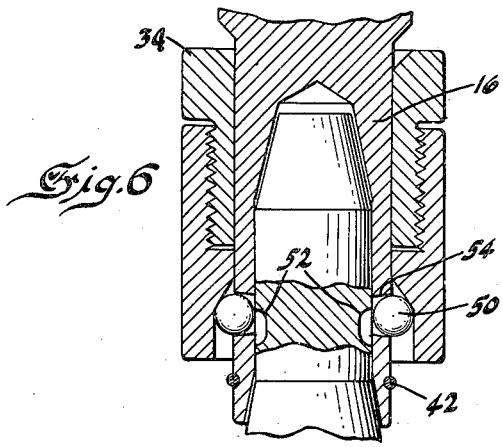
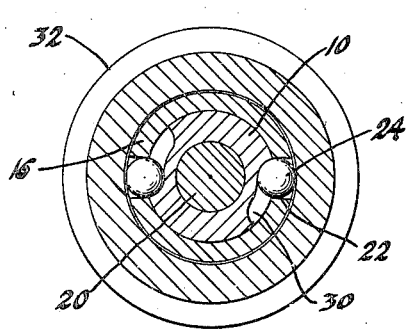
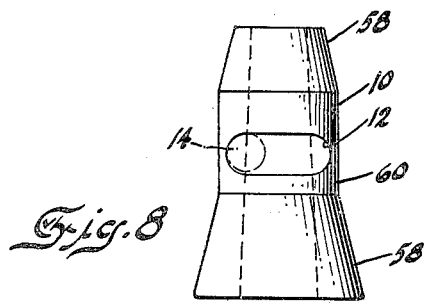
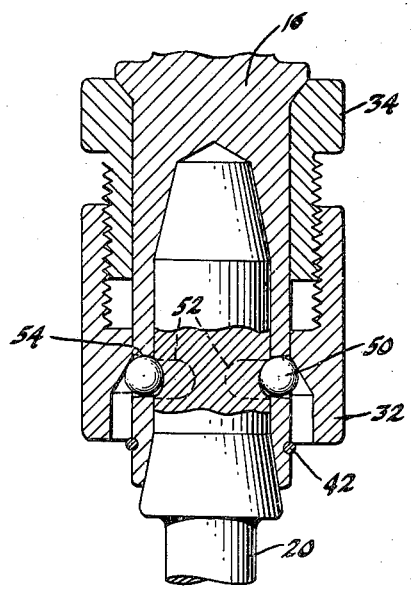
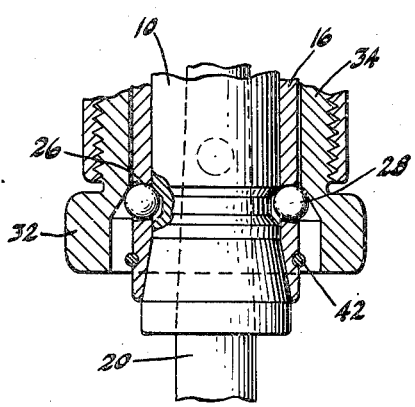
INVENTOR.
Alfred A. Panyard
BY
Parker & Burton
attorneys Patented Sept. 13, 1949

2,481,945

UNITED STATES PATENT OFFICE 2,481,945

TOOLHOLDING CHUCK

Alfred A. Panyard, Detroit, Mich., assignor to Springfield Detail & Machine Parts, Detroit, Mich., a copartnership composed of Hamilton Aldridge and Keith Aldridge Application October 30, 1944, Serial No. 560,956

8 Claims. (Cl. 279—82)

This invention relates to an improved tool holding chuck.

It relates particularly to what is commonly termed an automatic quick release tool holding chuck and to improvements therein wherein the tool is held at all times snugly within the socket of the driving chuck.

Heretofore tool holding chucks have been provided wherein a tool could be removed therefrom or placed therein without stopping the rotation of the chuck. Such a chuck was commonly provided with locking or driving balls which lock the shank of the tool within the chuck. These balls were held in position by a locking sleeve which slidably encircled the chuck body. This sleeve was adapted when in one position upon the chuck body, to hold the balls to lock the tool within the chuck to rotate therewith. When the sleeve was moved to another position upon the body it was adapted to release the balls from locking engagement between the shank of the tool and the chuck. The locking sleeve was so shaped and adapted to be so moved that the centrifugal force created by the rotation of the chuck would throw the balls out of their locking engagement and release the tool.

While this type of chuck possessed the advantage of quick release of a tool therefrom or quick replacement of a tool therein, all without stopping the rotation of the chuck, it possessed the disadvantage of failing to hold the shank of the tool snugly up to its seat within the chuck and was useable only with a tool that was being advanced downwardly.

This invention contemplates a chuck wherein the tool is at all times held tightly to its seat within the chuck and may also be quickly and readily released therefrom.

It contemplates a chuck which may support a tool for operation in any direction up or down or horizontal. It contemplates a chuck which while serving to hold the tool snugly therein will permit quick release of the tool therefrom or will permit another tool being placed therein, all without stopping the rotation of the chuck.

It contemplates a chuck wherein the locking or driving balls which lock the tool for driving, also serve the additional function of holding the tool snugly up in its socket in the chuck. It also contemplates a chuck provided not only with locking balls to lock the tool for driving and to release its driving engagement but an additional set of balls adapted to exert upward pressure on the tool to hold it to its seat within the socket.

This improved chuck is of simple sturdy construction. It is inexpensive. It is easy to operate to remove a tool therefrom or replace a tool therein. It holds the tool at all times snugly in place without wobble, displacement or chatter.

Other objects, advantages and meritorious features will more fully appear from the following description. appended claims and accompanying drawings, wherein:

Figure 4 is a cross sectional view taken on the line 4—4 of Figure 3.

Figure 5 is a cross sectional view taken on the line 5—5 of Figure 3.

Figure 6 is a vertical sectional view through a modified form of chuck with the locking balls released.

Figure 7 is a vertical sectional view taken on the same line as Figure 6 showing the locking balls held by the locking sleeve to lock the tool within the chuck.

Figure 8 is an elevation of an adapter designed to fit the shank of a tool and to be itself received within the chuck body.

Figures 1, 2, 3:
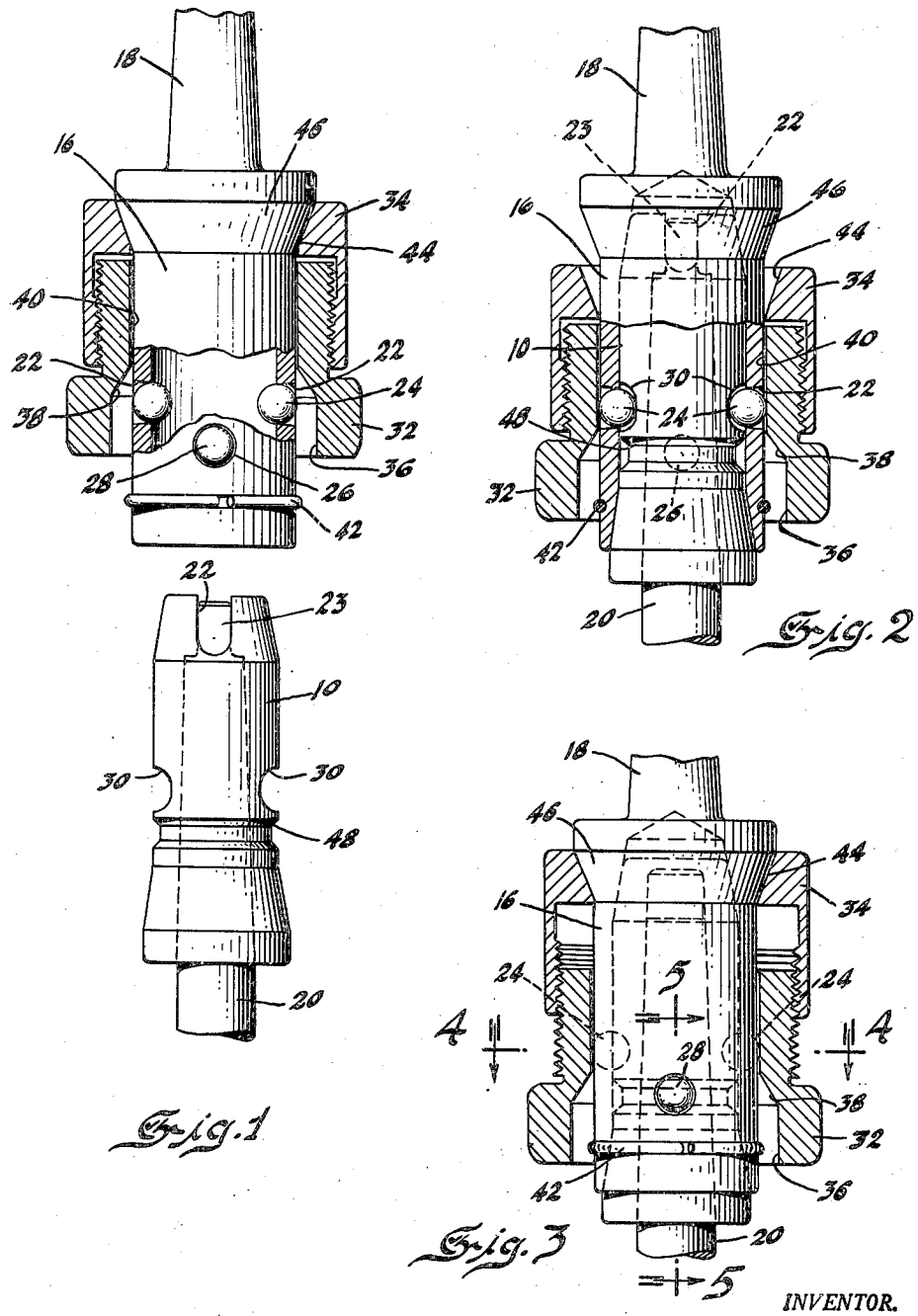
Figure 1 illustrates a chuck embodying my invention showing the tool and a tool adapter removed from the chuck body.
Figure 2 illustrates a chuck such as is shown in Figure 1 with the tool locked therein and held up in the socket by the weight of the locking sleeve on the balls.
Figure 3 illustrates the chuck of Figure 2 wherein the locking sleeve has been actuated to exert a positive pressure on the balls locking the tool with the chuck and holding it up within the socket of the chuck body so that the tool may be advanced in any direction without danger of release.

It is understood that it is common practice to provide what are termed adapters such as are shown in Figures 1 and 8 and other figures of the drawing. These adapters are capable of receiving the shank of a tool and frictionally engaging the same to drive the tool. The adapter is capable of receiving various tools and in turn it is capable of being received within the socket of a chuck body.

Such an adapter is shown in Figure 8. It is indicated by the numeral 10. When an adapter is used the adapter itself is provided with recesses to receive the locking balls. In Figure 8 such a recess is indicated as 12 and a locking ball is indicated as 14. It is apparent that instead of providing an adapter the shank of the tool itself may be provided with the locking ball recesses as shown in Figures 6 and 7.

Throughout the drawings a chuck is shown having a body portion 16 provided with a driving shank 18. The body portion is hollowed out to provide a socket adapted to receive the shank end of a tool or a tool adapter as shown in Figures 1, 2, 3, 6 and 7.

In Figure 1 the adapter 10 is shown as capable of being received within the socket of the chuck body. The adapter itself is hollow so as to receive the shank end of the tool 20. The upper end of the adapter is provided with a cutout 22 adapted to receive a key portion 23 of the shank of the tool 20.

The body of the chuck shown in the first three figures of the drawing is provided with two sets of ball retaining openings. This represents the preferred construction. One set of ball retaining openings is indicated at 22. Two openings are provided through the wall of the chuck body at opposite ends of the diameter. Balls 24 are disposed therein. These openings are slightly tapered outwardly as shown and the balls are of such a diameter that they cannot pass through the openings to fall out inside of the chuck body. The balls have a diameter which is greater than the thickness of the wall provided with the opening so that each ball projects on both sides beyond the thickness of the wall.

The second set of ball retaining openings is illustrated as spaced below the first set. These openings are indicated as 26. Two openings are provided arranged at opposite ends of a diameter. These openings are tapered as are the openings 22 heretofore described. Balls 28 are received therein. These balls have such a diameter that they will not pass through the openings into the interior of the chuck body and they will project on opposite sides of both surfaces thereof.

The shank of the tool or the tool adapter, whichever is used within the chuck body, is provided with ball receiving recesses adapted to receive the balls 24 and 28. In Figure 1 an adapter 10 is shown as designed to be received within the socket of the chuck body. This adapter is provided with a pair of oppositely disposed ball receiving recesses 30 as shown in Figures 1 and 4 designed to receive the locking balls 24 to lock the adapter to the chuck body to rotate therewith.

To hold the locking balls inwardly of the chuck body into the recesses in the adapter or tool shank a two part sleeve mechanism is slidably mounted upon the chuck body. This sleeve mechanism comprises a lower portion 32 which is threaded into an upper portion 34. The sleeve mechanism freely slidably surrounds the chuck body so that it may be readily raised and lowered thereover. Each portion is provided with a knurled outer surface so that it may be readily grasped. The interior of the part 32 of the sleeve mechanism is relieved as at 36 and provided with a beveled surface portion 38 and a cylindrical surface portion 40. To prevent the sleeve from falling downwardly off the chuck body a snap ring 42 is shown as encircling the chuck body and seated within a provided groove.

It will be apparent that the weight of the sleeve mechanism will urge the balls 24 inwardly into the recesses 30 and lock the adapter to the chuck body to rotate therewith as shown in Figure 2 but that when the sleeve is raised so that the relieved portion 36 is disposed opposite the balls as shown in Figure 1, the centrifugal force of rotation will throw the balls outwardly and release the adapter from its driven connection with the chuck body. It is therefore possible to grasp the sleeve mechanism and raise it while the chuck is being rotated to release the tool or to place another tool in position. The weight of the sleeve mechanism will hold the balls inwardly.

In order that the balls may be positively held inwardly without depending merely upon the weight of the sleeve mechanism, it is apparent that when the device is rotating in a given direction either the portion 34 or the portion 32 may be grasped in the hand and held against rotation so as to produce relative rotation of said parts 32 and 34. If the sleeve is in the position shown in Figure 1 the chuck is in what might be termed a loading position ready to receive a tool. When the tool is placed therein the sleeve portions 32 and 34 are dropped to the position shown in Fig. 2 with the part 32 urging the balls inwardly and being frictionally engaged with both sets of balls to rotate with the chuck.

When the device is in the position shown in Figure 2 and the balls are being held inwardly only by the weight of the sleeve mechanism, and considering the chuck as rotating to the right and the parts 32 and 34 as engaged by a right hand thread, if the upper portion 34 is grasped by the hand and held against rotation it brings upwardly relative to the portion 32 to bring the portion 34 into engagement with the shoulder 46 and thereby places an increased pressure upon the balls 28 and also holds the balls 24 inwardly regardless of whether the tool is pointed downwardly as shown in Figure 3 or is directed horizontally.

It is likewise apparent that when the device is in the position shown in Figure 3 it is possible to grasp the portion 32 of the sleeve and hold it against rotation and at the same time exert an upward pressure maintaining the contact between the beveled surfaces 44 and 46 which will cause the portion 32 to thread up into portion 34 and release the balls from their locking position.

In addition to the recesses 30 provided in the adapter or in the shank of the tool, the adapter is likewise recessed as at 48. This recess is in the form of a groove or channel which encircles the adapter and which has beveled side walls as shown in Figures 1, 2 and 3. This recess groove is adapted to receive the balls 28 which are carried by the chuck body. It will be noted that when the adapter is seated within the socket portion of the chuck body and the locking balls 24 are held inwardly to lock the adapted to be driven by the chuck body that the recess groove 48 is offset outwardly axially from the ball retaining openings in the chuck body which carry the balls 28. This is shown in Figures 2, 3 and 5. Due to this offset arrangement the balls 28 only partially enter the recessed channel 48.

The offset is such that the balls enter so as to exert a pressure upon the upper beveled face of the channel 48. They do not seat completely within the channel 48 (not particularly Figure 5) as the sleeve exerts an inward pressure upon the balls. Thus seated, these balls exert a lifting pressure upon the adapter tending to hold it upwardly within the socket in the chuck body and maintain the adapter tightly or snugly within said socket. If similar locking recesses are provided directly upon the tool shank, the same lifting effect is exerted directly thereupon.

It is apparent, therefore, that when the sleeve is in the position shown in Figures 3 and 5 that the lifting balls 28 are urged radially inwardly to exert a lifting effect upon the adapter as well as the locking balls being urged inwardly to lock the adapter to be driven by the chuck body. It is likewise apparent that these lifting balls are released by actuation of the sleeve in the same manner as the locking balls are released and are positively held in place also by the same actuation of the sleeve.

In Figures 6, 7 and 8 a modified form of construction is shown. In these figures only one set of balls are provided. The balls here are indicated as 50. The chuck body 16 is provided with only one set of ball retaining openings which are of a similar construction to the ball retaining openings heretofore described and the balls themselves are similarly proportioned so as to project beyond the inner and outer surface of the socket wall of the chuck.

These balls serve both as lifting balls and driving balls and the recesses 12 in the adapter or the recesses 52 in the shank 20 of the tool are offset the openings 54 in the chuck body within which the balls 50 are mounted. This offset is axially outwardly as has heretofore been described and as is shown in Figures 6 and 7 so that when the shank of the tool or adapter is seated within the socket of the chuck and the balls are urged inwardly by the sleeve mechanism a lifting effect is exerted tending to hold the adapter or tool shank up to its seat within the socket. The operation is as heretofore described except that only one set of balls is provided.

In Figure 8 an adapter is shown. In Figures 6 and 7 the adapter is omitted and recesses are provided directly within the shank of the tool.

It is apparent therefore that in applicant's construction not only is there provided a quick release for the tool and a positive locking to drive the tool in any position of use but also pressure is maintained through the lifting effect upon the balls to snugly hold the tool to its seat.

There is another feature which is of value, namely, the tool shank or the adapter is preferably provided as shown in Figures 6, 7 and 8 with a pair of beveled surfaces 58 separated by a cylindrical surface 60 (note Figure 8). These surfaces 58 are cut upon what might be termed a quick release angle. In other words, the taper is such that release can be readily accomplished. In order to insure a bearing throughout a considerable axial length while retaining the quick release feature, there is provided the intermediate cylindrical surface 60. This insures a bearing throughout a substantial length and yet also insures quick release which would be difficult to obtain in a long shank without increasing unduly the diameter of the shank.

What I claim is:

1. A tool holding chuck comprising, in combination, a chuck body having a tool shank receiving socket and a sleeve engaging abutment exteriorly of the body, a tool shank element receivable within said socket, locking balls mounted within openings in the wall of said socket axially spaced from said abutment and having a diameter to project beyond the inner and outer surfaces of the socket, said tool shank element recessed to receive said locking balls to lock the tool shank to the chuck body, an extensible locking sleeve formed of two threadedly relatively telescopically coupled sleeve parts rotatably and slidably surrounding the body between the abutment and the locking balls, one part of said sleeve having one tapered inner surface portion adapted to engage said balls to urge them into the recessed portion of the shank element and having another inner surface portion relieved to receive said balls to permit withdrawal thereof from the recessed shank element, the other part of said sleeve adapted when said sleeve is extended to engage the abutment of the chuck body to urge the balls toward the recessed shank element.

2. A tool holding chuck comprising, in combination, a chuck body having a tool shank receiving socket and a sleeve engaging abutment exteriorly of the body, a tool shank element receivable within said socket and adapted to abut the base portion thereof to seat completely therewithin, locking balls mounted within openings in the wall of said socket axially spaced from said abutment and having a diameter to project beyond the inner and outer surfaces of the socket, said tool shank element recessed to receive said locking balls to lock the tool shank to the chuck body, an extensible locking sleeve formed of two threadedly relatively telescopically coupled sleeve parts rotatably and slidably surrounding the body between the abutment and the locking balls, one part of said sleeve having one tapered inner surface portion adapted to engage said balls to urge them into the recessed portion of the shank element and having another inner surface portion relieved to receive said balls to permit withdrawal thereof from the recessed shank element, the other part of said sleeve adapted when said sleeve is extended to engage the abutment of the chuck body to urge the balls toward the recessed shank element, said recessed portion of the shank element being offset axially outwardly from the ball containing openings in the chuck body when the shank element is in abutting engagement with the base portion of the socket of the chuck body, said offset being such that the balls when urged by the sleeve toward the recessed shank element will exert a pressure tending to urge the shank element tightly into engagement with the base portion of said socket.

3. A tool holding chuck comprising, in combination, a chuck body having a tool shank receiving socket, a tool shank element adapted to seat within said socket, locking balls mounted within openings in the wall of the socket and having a diameter to project beyond the inner and outer surfaces of the socket, said tool shank element recessed to receive said locking balls to lock the tool shank to the chuck body to be driven thereby, sleeve mechanism slidably surrounding the body and having one inner surface portion adapted to engage said balls to urge them into the recessed portion of the shank element and having another inner surface portion relieved to receive said balls to permit their withdrawal from the recessed shank element, said sleeve mechanism comprising two threadedly engaged relatively adjustable parts shiftable as a unit or relative to one another over said chuck body, said chuck body provided with a shoulder adapted to be frictionally engaged by one of said parts to hold the sleeve mechanism against said balls.

4. A tool chuck comprising, in combination, a chuck body having a tool shank element receiving socket, a tool shank element adapted to seat within said socket, driving balls mounted within openings through the wall of the socket and projecting beyond the inner and the outer surfaces thereof, said tool shank element provided with recesses adapted to receive said balls to lock the tool shank element to the chuck body to rotate therewith, lifting balls mounted within openings through the wall of the socket and projecting beyond the inner and the outer surfaces thereof, said tool shank element provided with a ball receiving recessed portion offset axially away from the lifting ball retaining openings in the chuck body when the shank element is seated within the chuck body adapted to receive said lifting balls, a sleeve slidably surrounding the chuck body having one part adapted to engage said driving balls to urge them into the recesses within the shank element and having another part adapted to receive said balls to permit withdrawal thereof from the recesses in the shank element, said sleeve having one portion adapted to engage the lifting balls to urge them into the recessed shank element to exert pressure thereon tending to seat the shank element within the chuck body, said sleeve having another portion adapted to permit withdrawal of the lifting balls thereinto from the shank element.

5. A tool chuck comprising, in combination, a chuck body having a tool shank element receiving socket, a tool shank element adapted to seat within said socket, driving balls mounted within openings through the wall of the socket and projecting beyond the inner and the outer surfaces thereof, said tool shank element provided with recesses adapted to receive said balls to lock the tool shank element to the chuck body to rotate therewith, lifting balls mounted within openings through the wall of the socket and projecting beyond the inner and the outer surfaces thereof, said tool shank element provided with a ball receiving recessed portion offset axially outwardly from the lifting ball retaining openings in the chuck body when the shank element is seated within the chuck body adapted to receive said lifting balls, a sleeve slidably surrounding the chuck body having one part adapted to engage said driving balls to urge them into the recesses within the shank element and having another part adapted to receive said balls to permit withdrawal thereof from the recesses in the shank element, said sleeve having one portion adapted to engage the lifting balls to urge them into the recessed shank element to exert pressure thereon tending to seat the shank element within the chuck body, said sleeve having another portion adapted to permit withdrawal of the lifting balls thereinto from the shank element, said sleeve having a part associated therewith and with the chuck body and being adjustable relative thereto to exert a constant pressure on the sleeve tending to urge the lifting balls toward the recessed portion of the shank element.

6. A tool chuck comprising, in combination, a chuck body having a tool shank element receiving socket, a tool shank element adapted to seat within said socket, driving balls mounted within openings through the wall of the socket and projecting beyond the inner and the outer surfaces thereof, said tool shank element provided with recesses adapted to receive said balls to lock the tool shank element to the chuck body to rotate therewith, lifting balls mounted within openings through the wall of the socket and projecting beyond the inner and the outer surfaces thereof, said tool shank element provided with a ball receiving recessed portion offset axially outwardly away from the lifting ball retaining openings in the chuck body when the shank element is seated within the chuck body adapted to receive said lifting balls, a sleeve including threadedly coupled portions surrounding the chuck body, one portion of the sleeve adapted in one position upon the chuck body to engage said balls to urge them toward the recesses of the shank element and adapted in another position upon the chuck body to receive said balls to permit withdrawal thereof from the recesses in the shank element, said other portion of the sleeve operable to engage the chuck body to exert a pressure upon the ball engaging portion of the sleeve to urge said balls toward the recesses of the shank element.

7. A tool chuck comprising, in combination, a chuck body having a tool shank element receiving socket, a tool shank element adapted to seat within said socket, driving balls mounted within openings through the wall of the socket and projecting beyond the inner and the outer surfaces thereof, said tool shank element provided with recesses adapted to receive said balls to lock the tool shank element to the chuck body to rotate therewith, lifting balls mounted within openings through the wall of the socket and projecting beyond the inner and the outer surfaces thereof, said tool shank element provided with a ball receiving channel recess encircling the shank element and offset axially outwardly away from the lifting ball retaining openings in the chuck body when the shank element is seated within the chuck body and adapted to incompletely receive said lifting balls, a sleeve slidably surrounding the chuck body and having one part adapted in one position of the sleeve upon the body to urge said balls toward the ball receiving recesses in the shank element, said sleeve having another part adapted in another position of the sleeve upon the body to receive said balls to permit withdrawal thereof from the recesses within the shank element.

8. In combination with a tool holding chuck including a socket, locking jaw members mounted within openings in the wall of the socket, and a tool shank element insertable in said socket and provided with recessed portions for receiving said jaw members to lock the tool shank to the chuck body, a two part locking sleeve surrounding said socket member and rotatable and axially slidable with respect thereto, the parts of said sleeve being relatively rotatable with respect to one another, means for axially moving one part with respect to the other part when relative rotation of the parts occurs, means for engaging one of said parts with the locking jaw members and upon axial movement in one direction to urge the jaw members into the recessed portions of said tool shank element, and means for engaging the other of said parts with the body of the chuck for rotation thereby.

ALFRED A. PANYARD.

REFERENCES CITED

The following references are of record in the file of this patent:

UNITED STATES PATENTS

| Number | Name | Date |
| --- | --- | --- |
| 1,174,997 | Lackner | Mar. 14, 1916 |
| 1,345,583 | Church | July 6, 1920 |
| 1,582,010 | Hanson | Apr. 20, 1926 |
| 1,636,421 | Knott | July 19, 1927 |

FOREIGN PATENTS

| Number | Country | Date |
| --- | --- | --- |
| 10,224 | Great Britain | 1914 |
| 580,001 | France | 1924 |
| 658,792 | Germany | 1938 |